United States Patent [19]

Strickland et al.

[11] 4,209,882
[45] Jul. 1, 1980

[54] LIGHT CELL AUTO SLEEVER

[75] Inventors: John J. Strickland, Alachua; Thomas H. Hoover, Gainesville, both of Fla.

[73] Assignee: General Electric Company, Gainesville, Fla.

[21] Appl. No.: 943,753

[22] Filed: Sep. 19, 1978

[51] Int. Cl.² ............................................. B23P 19/04
[52] U.S. Cl. ................................. 29/33.52; 29/564.6; 29/623.1; 29/731; 53/291
[58] Field of Search .................... 29/33 E, 33 J, 33 K, 29/33.52, 33.5, 730, 731, 623.1, 234, 564.1, 564.6; 53/291, 292, 296

[56] References Cited

U.S. PATENT DOCUMENTS 3,974,628  8/1976  Konstantin ............................. 53/291
4,118,915 10/1978  Swenson ................................ 53/296

Primary Examiner—Gil Weidenfeld

[57] ABSTRACT

An apparatus for applying and affixing sleeves of dielectric plastic material to galvanic cells. The apparatus includes a carrousel having a cell receiving station, a sleeving station and a discharge station with a tester for testing and rejecting cells between the receiving and sleeving stations. The apparatus further includes feeding means for feeding sleeve length units from a spool supply, gripping means for gripping each fed length, while such length is cut and for opening the cut length, pusher means for pushing the cut length from the gripper onto the cell and heater means for heating and shrinking the cut length on the cell into gripping contact with such cell.

17 Claims, 28 Drawing Figures

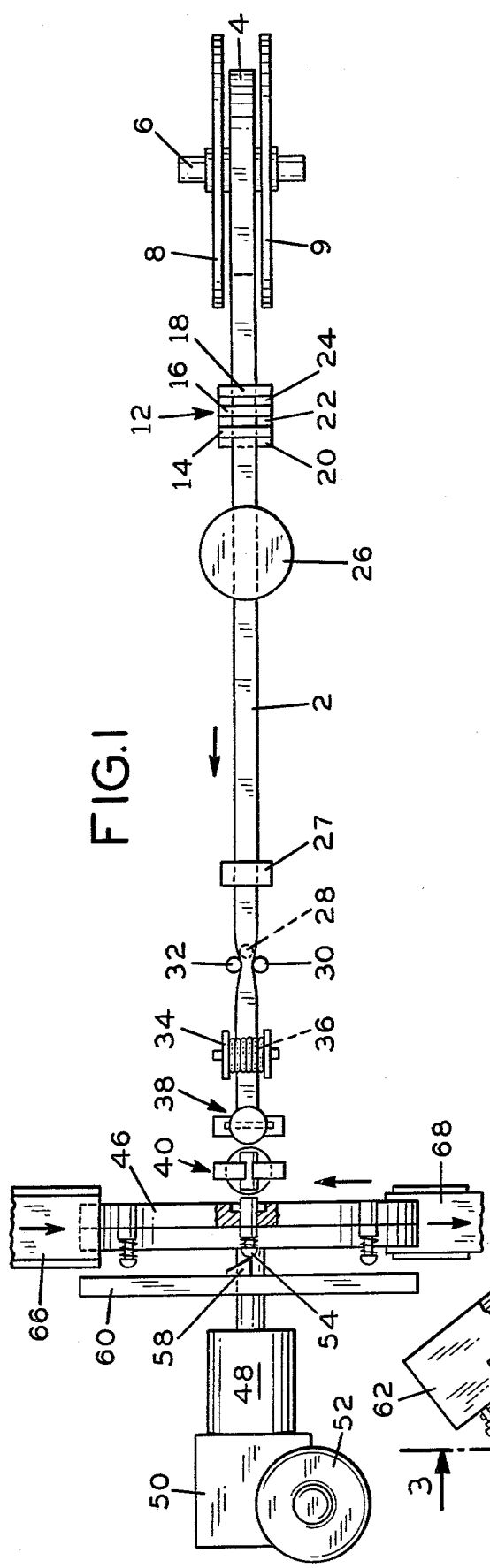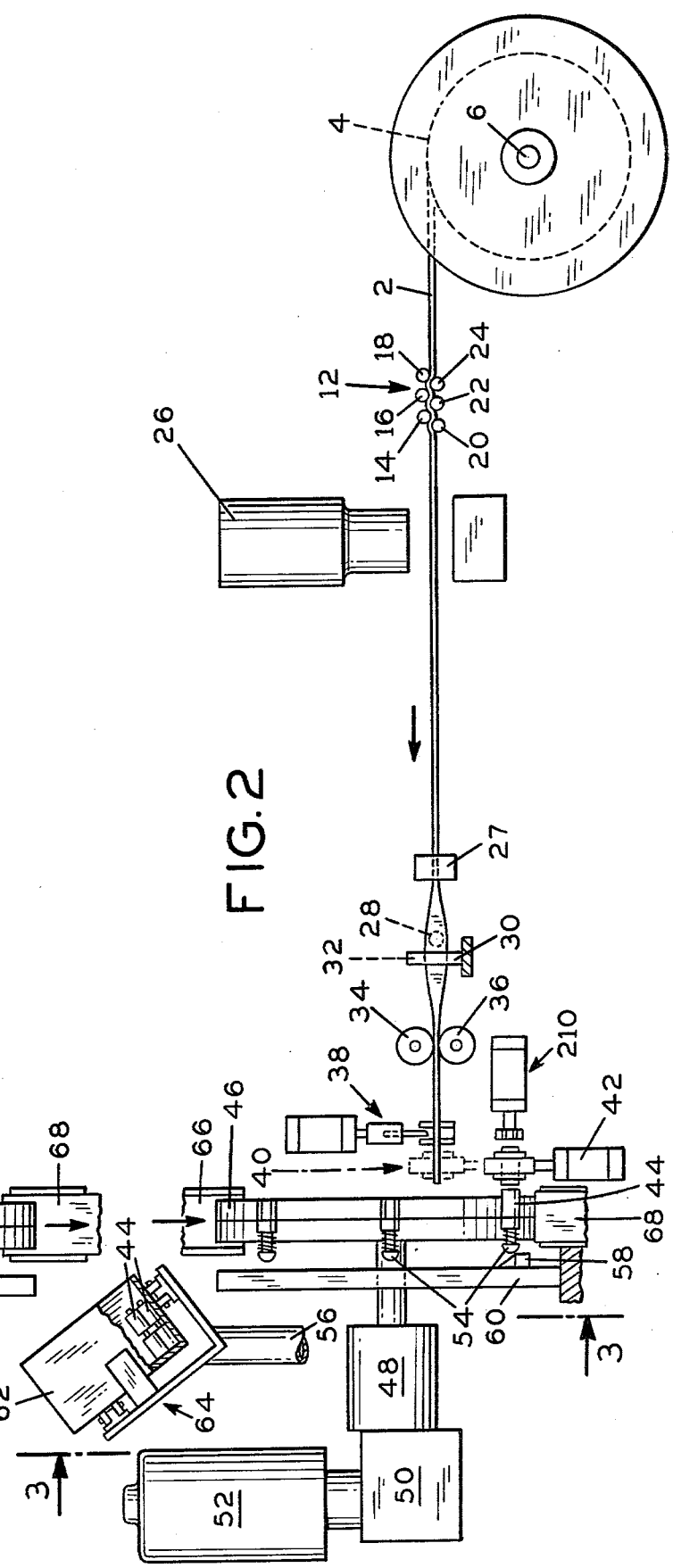

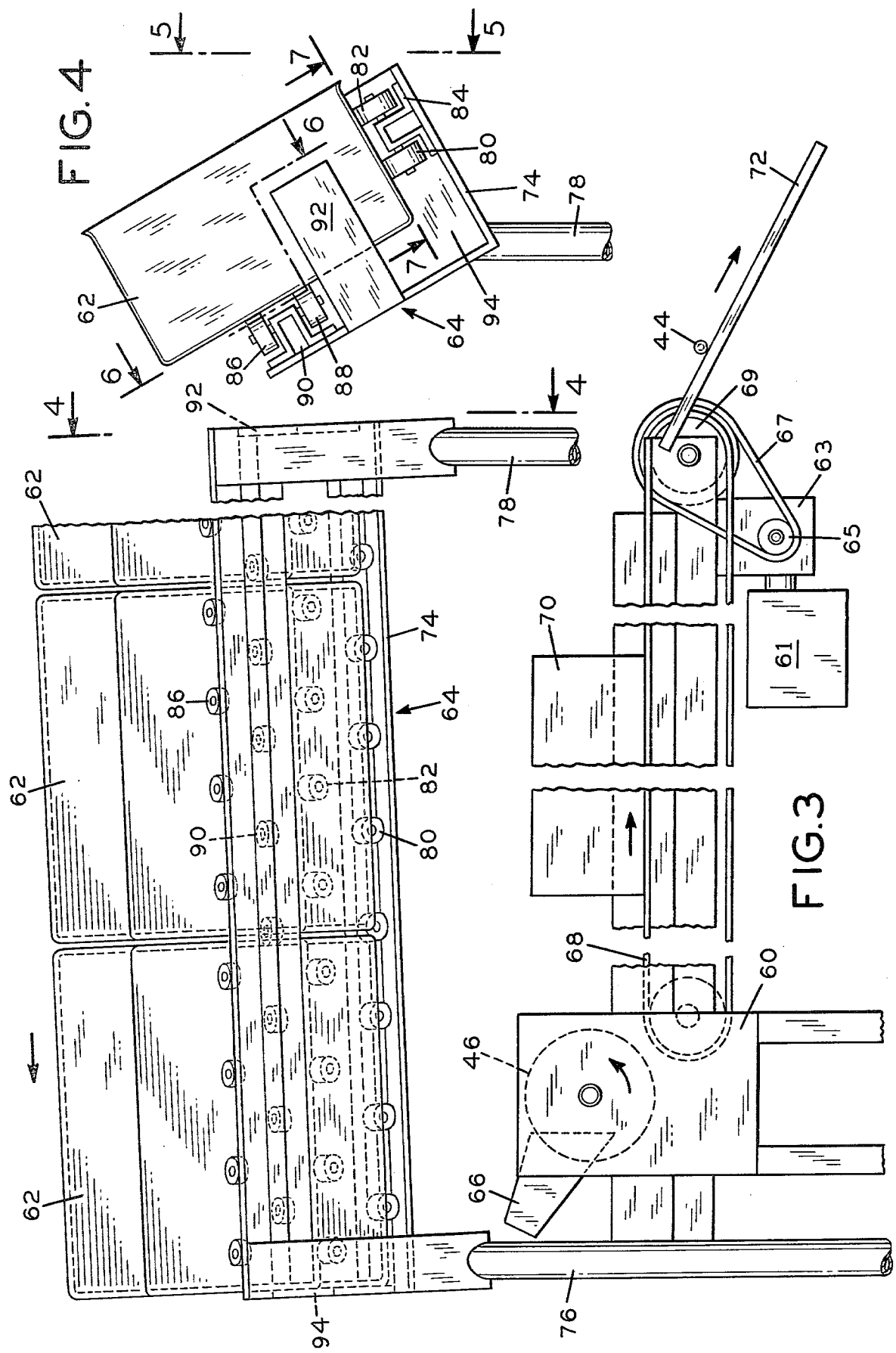

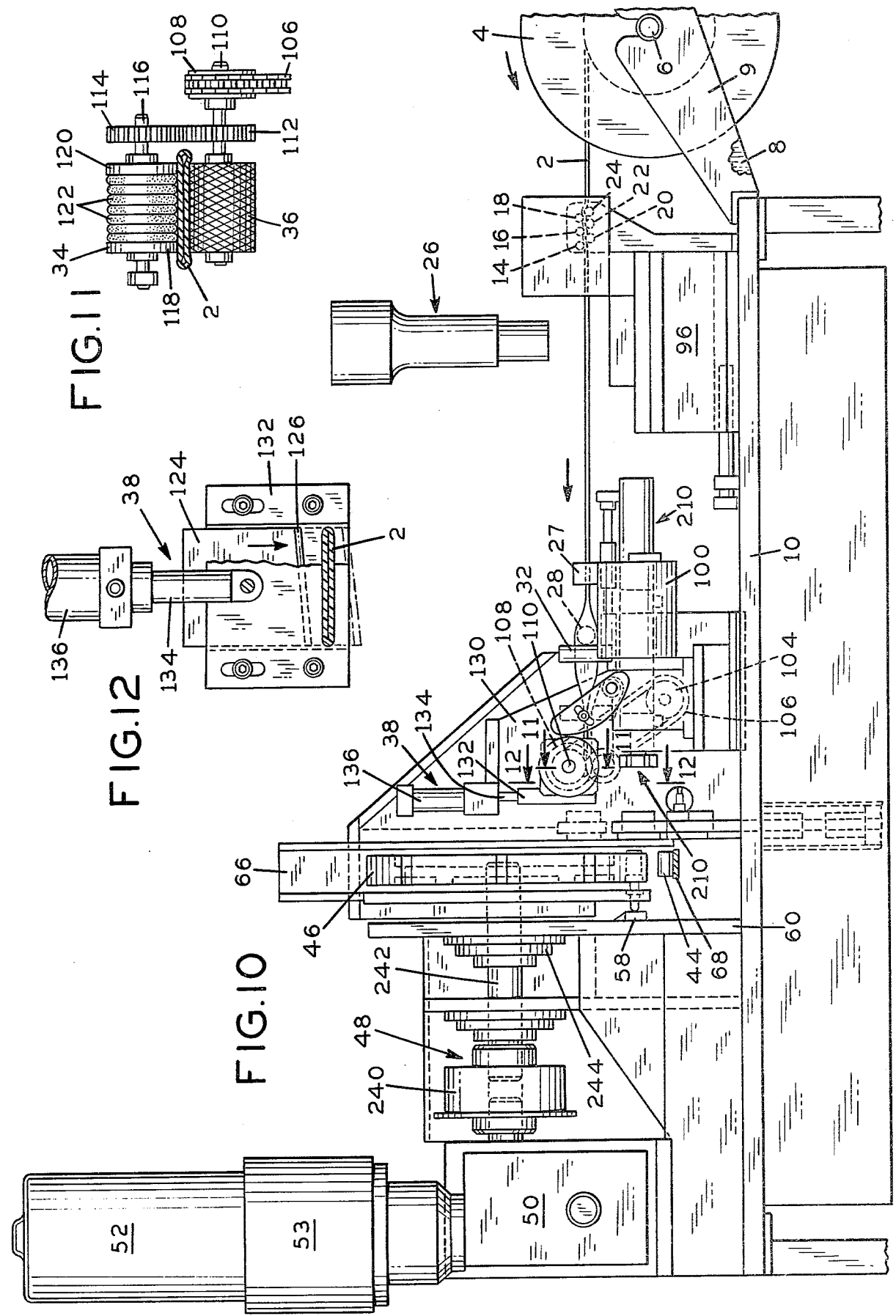

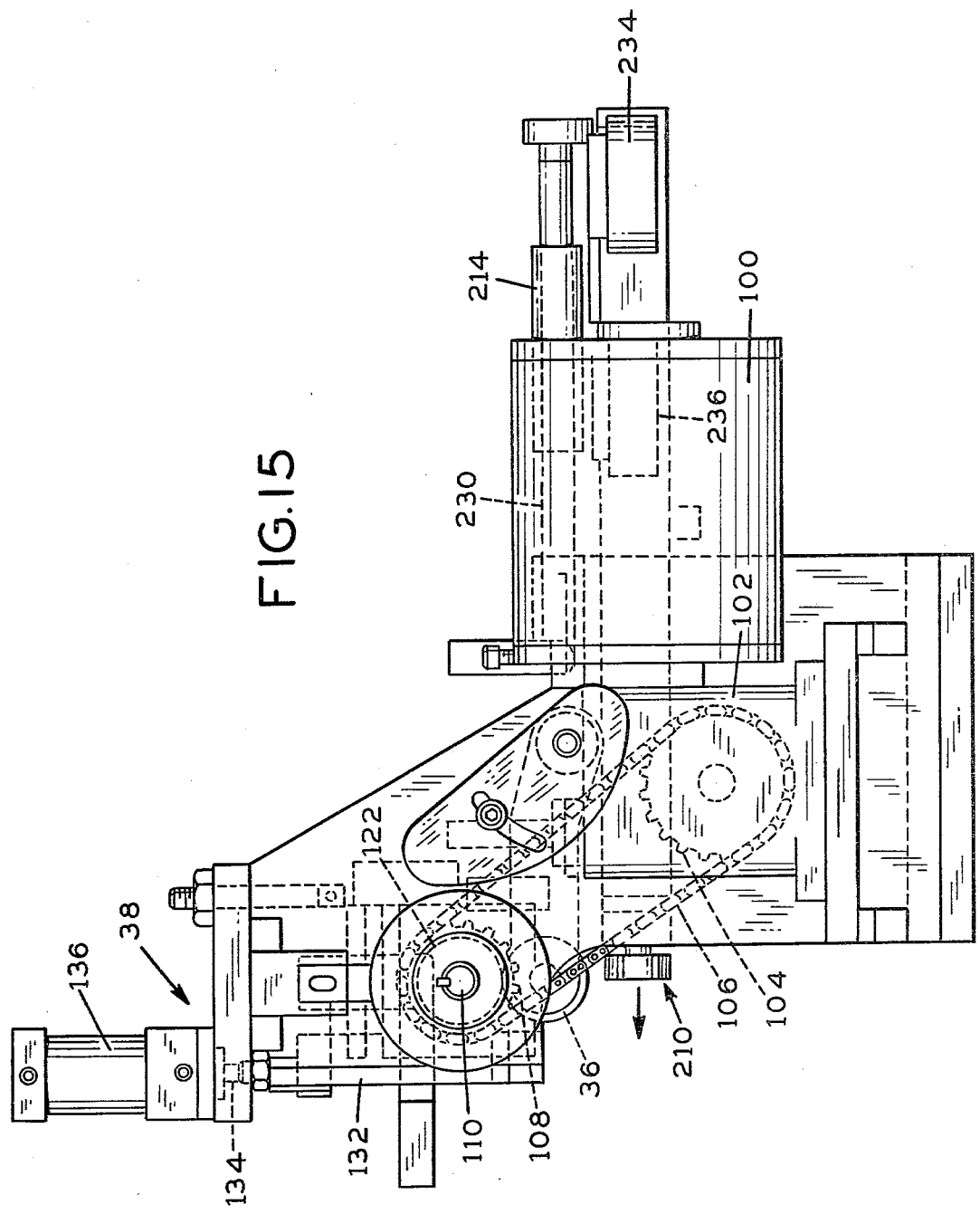

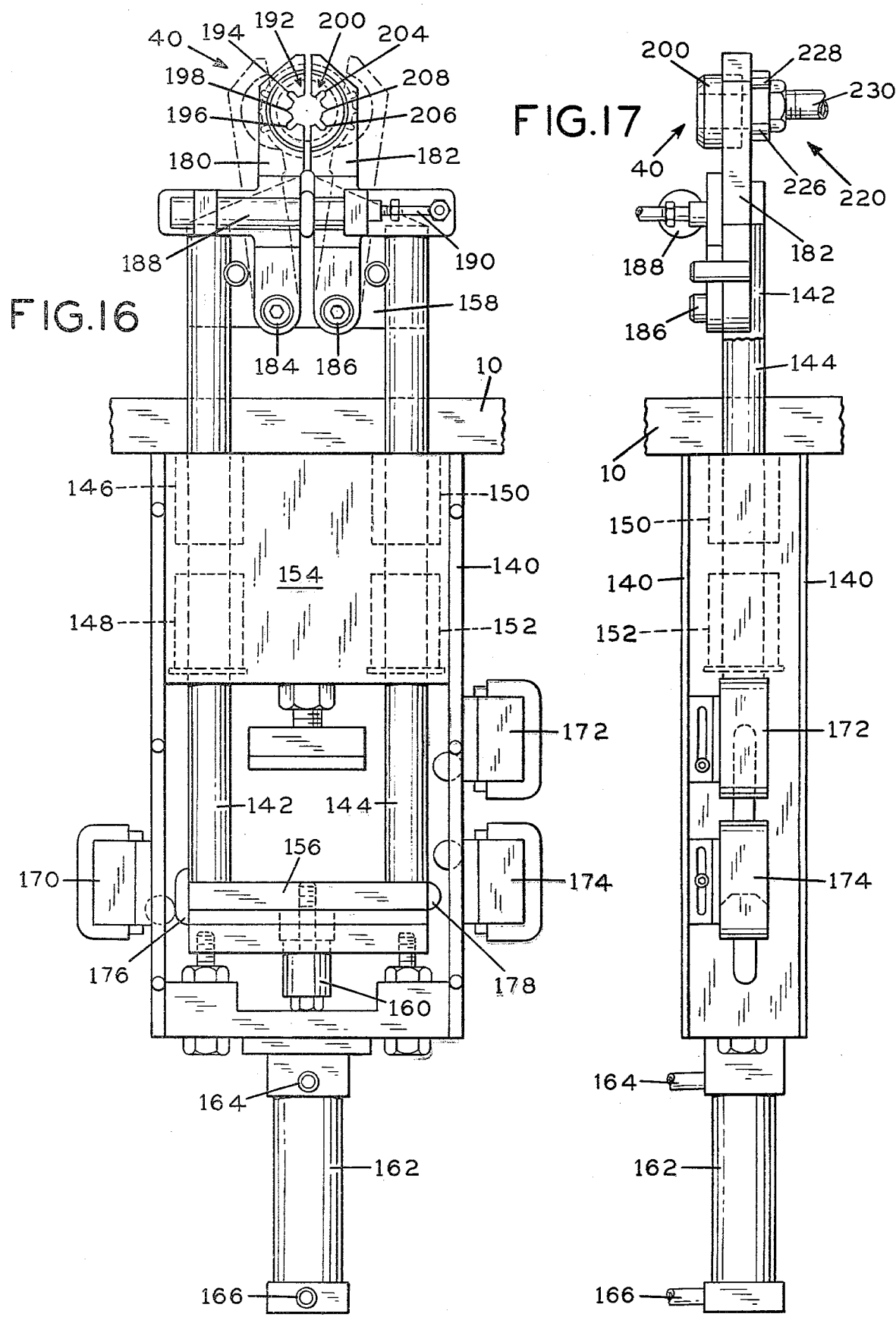

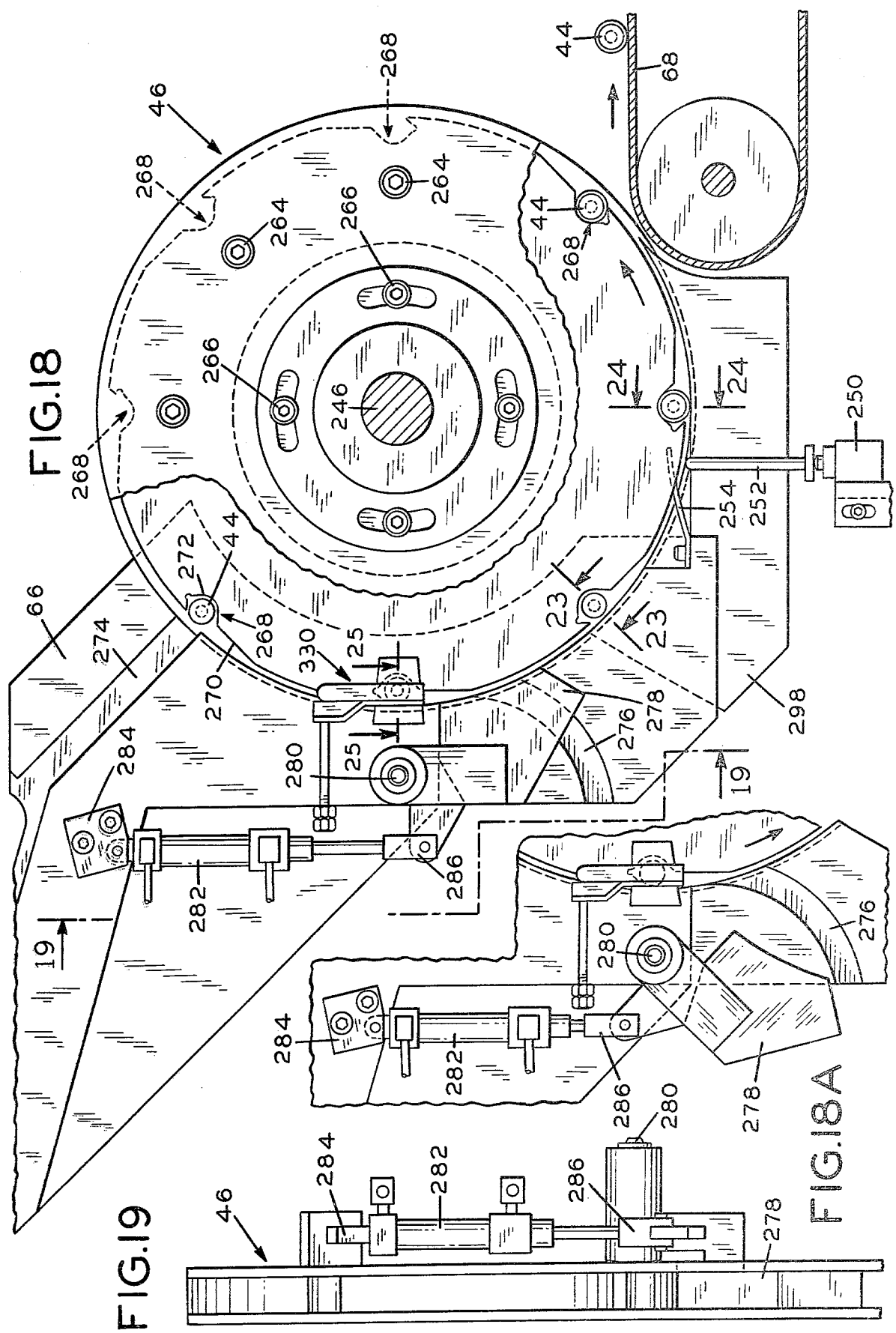

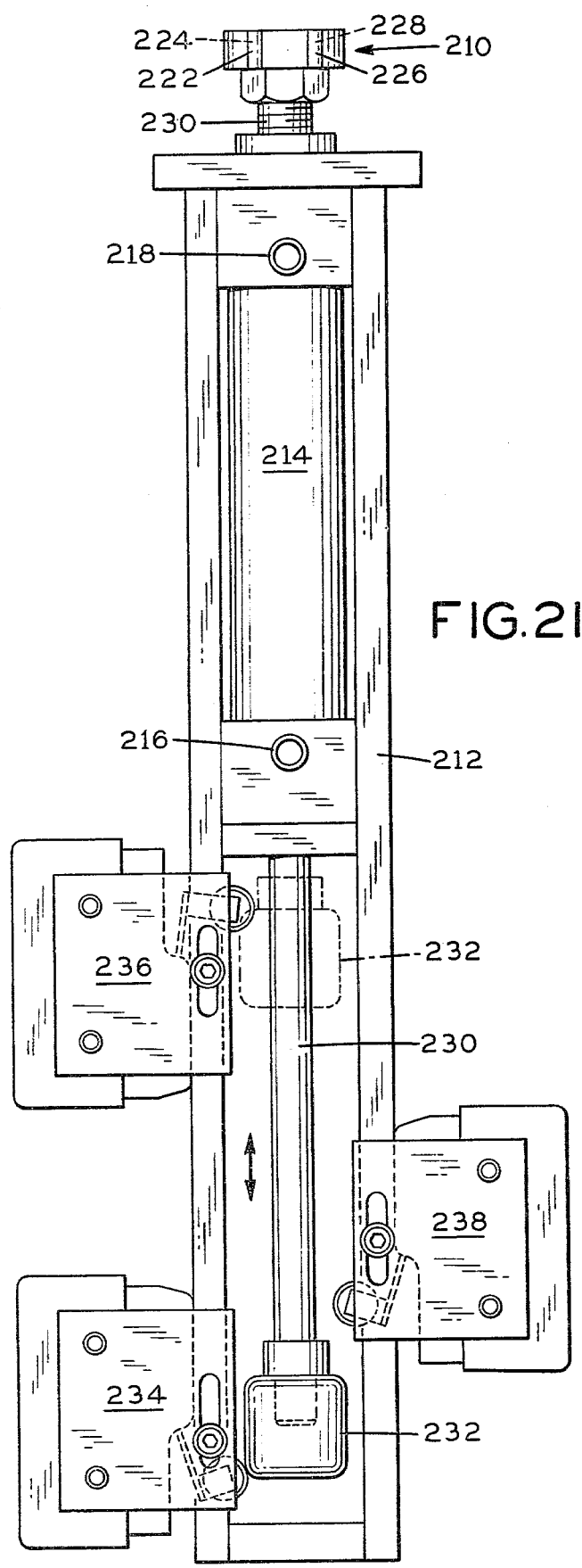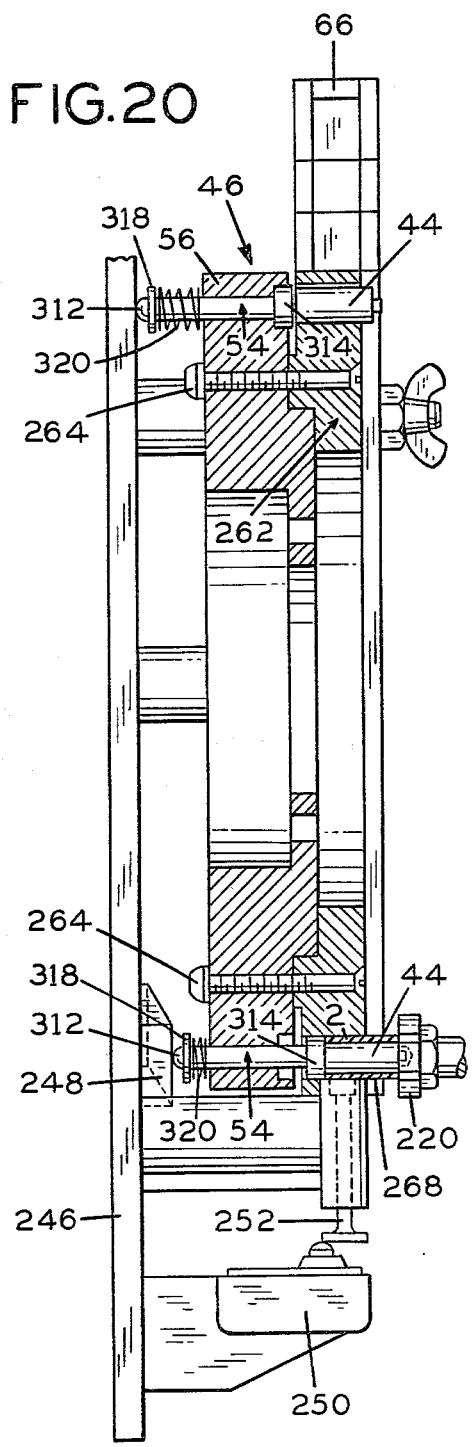

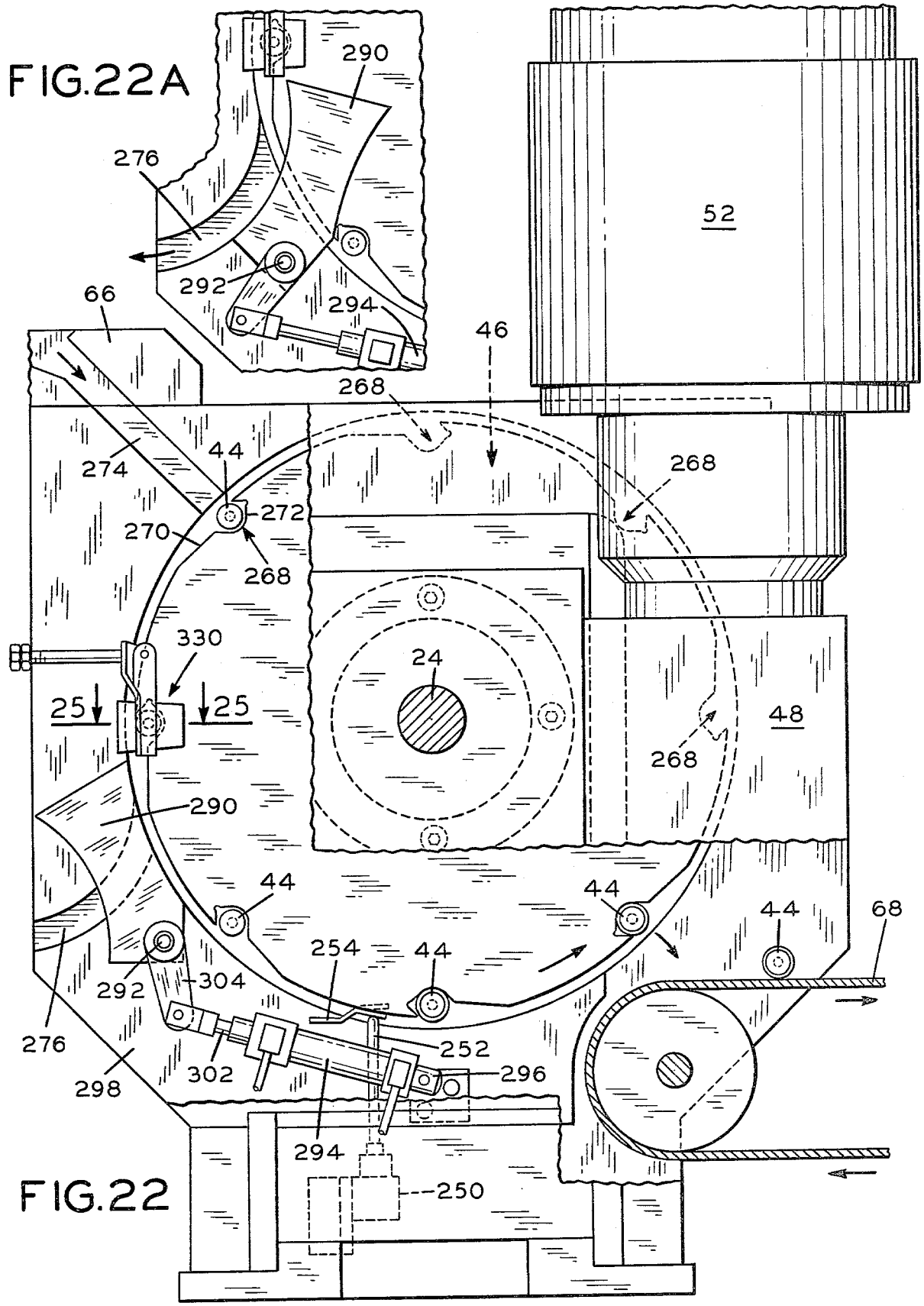

LIGHT CELL AUTO SLEEVER

This invention relates to an apparatus for assemblying galvanic cells and, more particularly, to apparatus for applying dielectric sleeves to cell casings.

In the manufacture of galvanic or battery cells, positive and negative plates are wound into a coil with separator material between the coils. The wound coil is inserted into a metal casing or can open at the end through which the coil is inserted and closed at its opposite end. One of the plates, usually the negative plate, is electrically connected, such as by welding, to the metal casing wall and the other plate, usually the positive, is electrically connected, also such as by welding, to a post or terminal on a cap member. The post or terminal on the cap is surrounded by a dielectric or insulating material. The cap is applied and sealed to the open end of the casing or can and forms a closure thereon. In the cell, the metal casing wall forms one electrical terminal and the cap post forms the other.

After the plates and separator have been coiled, the coil has been inserted in the casing or can, the plates have been electrically connected to the metal casing wall and cap terminal or post and the end of the battery has been capped and closed, it is conventional practice to place a wrapping or sleeve of non-conductive, dielectric material around the casing. The bottom of the metal casing is left exposed. By inserting such battery or cell between positive and negative terminals located at the opposite ends of the cell, the cell or battery is electriclly connected to supply current, for example, in a calculator, flashlight, appliance, etc.

The wrapping or sleeving of the cell would appear to be relatively simple procedure. The proper positioning of the wrapping or sleeving on the cell is, however, of substantial importance not only to the functioning of the cell when it is installed between terminals in, for example, a calculator, flashlight, or the like, but is also important to the marketability of the cell. For example, labels, specifications and other indicia are customarily included on the sleeve or wrapper. The uniformity, appearance and placement of the wrapper or sleeve on the cell is, therefore, of substantial importance.

In the instant invention, an apparatus is provided for printing and installing sleeves on cells in an efficient, uniform, consistent and high speed manner. The cells are inserted, one after another, into circumferentially arranged openings in a carrousel. As the cell is advanced in the carrousel cell alignment is checked and mis-aligned cells are rejected. Cells in proper alignment are indexed by the carrousel to a sleeving station where a precut and premarked sleeve of thermically shrinkable dielectric material is slipped over the cell. The sleeved cell is then indexed to a discharged station and discharged on to a conveyor. The conveyor carries the sleeved cell through a heating tunnel where the sleeve is shrunk on to the cell. The cell is discharged from the conveyor with the sleeve in firm, fixed position on the cylindrical cell wall.

The sleeve material utilized in the apparatus of the instant invention is heat shrinkable, tubular plastic, flattened and coiled on to a spool. The flattened, heat shrinkable tubular material is unwound by the instant apparatus from the spool passed through a stamping station where the indicia to appear on the cell is applied to the plastic. The flattened plastic is then opened up into a tube, fed between rollers which unwind and advance the tubular material from the spool and is then fed, in a predetermined measured sleeve length through a guillotine and into a gripper. While the sleeve length end of the plastic tube is held by the gripper, the sleeve length section is cut from the end of the tube by the guillotine, the cut sleeve length is opened up by the gripper and advanced to the sleeving station. At the sleeving station, the cut length which is now opened up into substantially a circular sleeve by the gripper is pushed out of the gripper by a plunger and pushed on to the cell waiting at the sleeving station. The cell, with the sleeve thereon, is discharged on to a conveyor, passes on the conveyor through a heated chamber where the sleeve shrinks on to the cell and is then discharged from the conveyor, sleeved and marked.

The apparatus of the instant invention, as will be described, feed, cuts and advances the cut sleeve lengths in response to the cells in the carrousel. Thus, where there is a cell to be sleeved advanced by the carrousel to the sleeving station, a cut sleeve length of the tubular sleeve material is advanced and pushed on to the cell. Where, on the other hand, the cell is found to be mis-aligned and has been discharged from the carrousel ahead of the sleeving station, sleeve material is not fed and cut.

The instant invention will be more understood from the following description of the preferred embodiment taken with the appended drawings in which FIG. 1 is a plan view, largely schematic, showing the general arrangement of the apparatus;

FIG. 2 is a side view of the apparatus of FIG. 1;

FIG. 3 is an end view taken at 3—3 FIG. 2;

FIG. 4 is an end view of the feed conveyor taken at 4—4 FIG. 3;

FIG. 10 is a side view of the apparatus of FIG. 8;

FIG. 11 is a view, partly in section, taken at 11—11 FIG. 10, and showing the feed rollers;

FIG. 12 is a view, partly in section, taken at 12—12 FIG. 10 and showing the guillotine;

FIG. 15 is a side view of the feed roller and pusher drives of the instant apparatus;

FIG. 16 is an enlarged end view of the gripper and gripper actuator;

FIG. 17 is a side view of the apparatus of FIG. 16;

FIG. 18 is an enlarged back view, partly in section, of the carrousel and battery feed and feed control of one of the embodiments of the invention;

FIG. 18A is a broken away view of a portion of the apparatus of FIG. 18;

FIG. 19 is a side view of the apparatus FIG. 18;

FIG. 20 is an enlarged view, partly in section, taken from the side of the carrousel;

FIG. 21 is a plan view of the pusher assembly;

FIG. 22 is an end view, similar to FIG. 18 but showing a second embodiment of the carrousel arrangement;

FIG. 22A is a partial view, broken away, of a portion of the assembly of FIG. 22 but showing the apparatus in open position;

Figure 5:
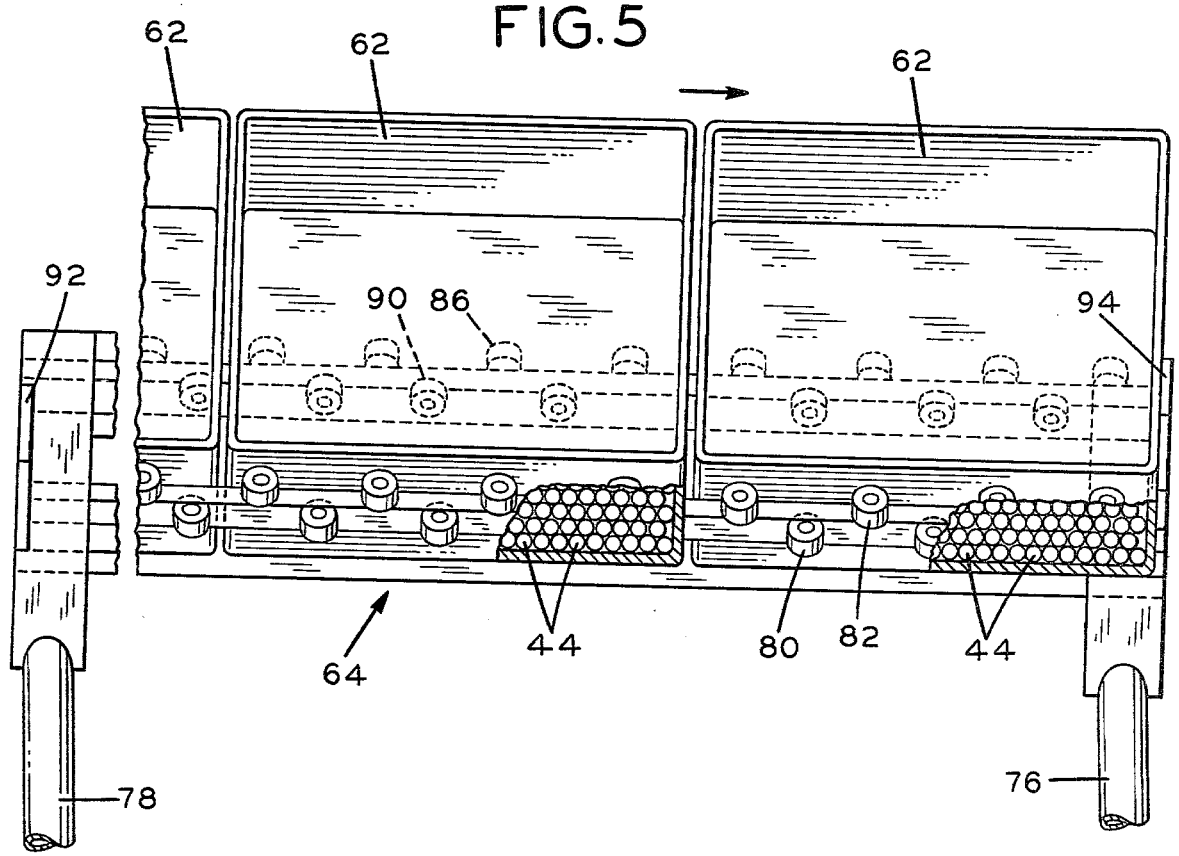
FIG. 5 is a front view, partly broken away, of the feed conveyor taken at 5—5 FIG. 4.
Figure 6:
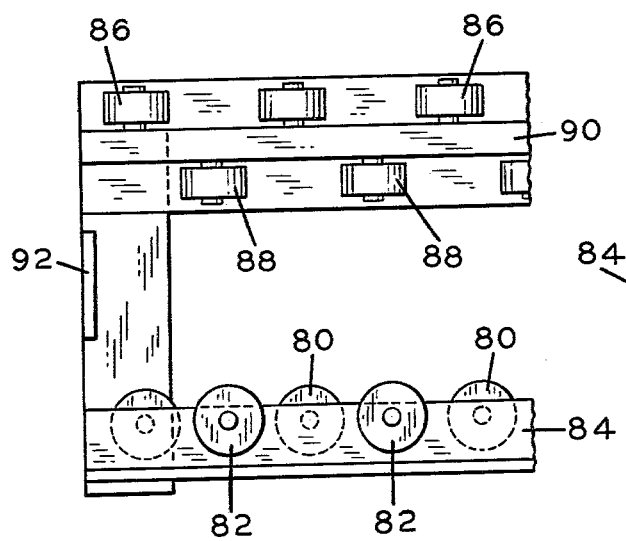
FIG. 6 is an enlarged view of the back conveyor rollers taken at 6—6 FIG. 4.
Figure 7:
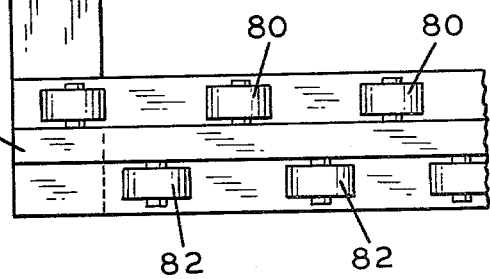
FIG. 7 is an enlarged view of the bottom conveyor rollers at 7—7 FIG. 4.

Referring now to the drawings, particularly FIGS. 1 and 2 thereof, tubular plastic 2 is provided wound onto a spool 4 which is mounted in the apparatus of the instant application for rotation about shaft 6, on carrier 8, 9 fastened to frame 10, FIG. 10. Tubular plastic 2 is fed through a stationary drag brake, generally designated 12, made up of opposing stationary posts 14, 16, 18, 20, 22, 24 and passes through stamping station, generally designated 26, and photocell sensor 27. From sensor 27, the tubular plastic, with ball 28 therein for purposes more clearly described later herein, is pulled between stationary posts 30, 32 by drive wheels 34, 36 and passed through guillotine, generally designated 38, and into grippers, generally designated 40. In a manner later described, drive wheels 34, 36 are controlled so as to pull a predetermined length of tubular plastic 2 from reel 4, through drag brake 12, past stamping station 26 and sensor 27, between posts 30, 32 and through guillotine 38 into grippers 40.

After a prescribed length of tubular plastic 2 has been fed through guillotine 38 into grippers 40, the grippers 40 and guillotine 38 are actuated, grippers 40 gripping the end of tubular plastic 2 while guillotine 38, severs the feed length from the end of tubular plastic 2. Grippers 40 open the plastic into a tube, as will be more fully described later herein. Grippers 40, actuated by air cylinder, generally designated 42, move the tubular end cut by guillotine 38 vertically downward to alignment with battery 44 in carrousel 46 indexed by an indexing drive, generally designated 48, and driven by roller gear indexing drive 50 and motor 52. In a manner, later described, battery 44 is moved laterally of carrousel 46 by button 54 in button disc 56, advanced in disc 56 by the contact of the end of button 54 with cam 58 on stationary support 60.

Batteries 44 are fed, in bulk, in tub 62 on roller conveyor, generally designated 64, FIG. 2, and are positioned, one after the other by the operator, on in-feed chute 66. As each battery 44 is sleeved in the apparatus of the instant invention, the sleeved battery 44 is discharged from carrousel 46 onto discharge conveyor 68. Conveyor 68 is driven by motor 61 which drives gear box 63, pulley 65, belt 67 and pulley 69.

Referring to FIG. 3, the sleeved batteries 44 discharged from carrousel 46 into conveyor 68 pass through heat tunnel 70 and are discharged onto discharge chute 72. The sleeve, as the sleeved battery 44 passes through tunnel 70, is shrunk onto the casing of battery 44.

As best shown in FIGS. 3 and 4, roller conveyor 64 is made up of "L" shaped frame 74, supported, at its opposite ends, by stantions 76, 78 so that the conveyor slopes slightly from right to left, FIG. 3, causing bins 62 to roll, by gravity, toward in-feed chute 66. Frame 74 is tilted on stantions 76, 78, tilting horizontal rollers 80, 82 on carrier 84 and rollers 86, 88 on carrier 90 so that bins 62 are tilted backward as best shown in FIG. 4. Stops 92, 94 are fixed to the opposite ends of roller conveyor 64.

Figure 8:
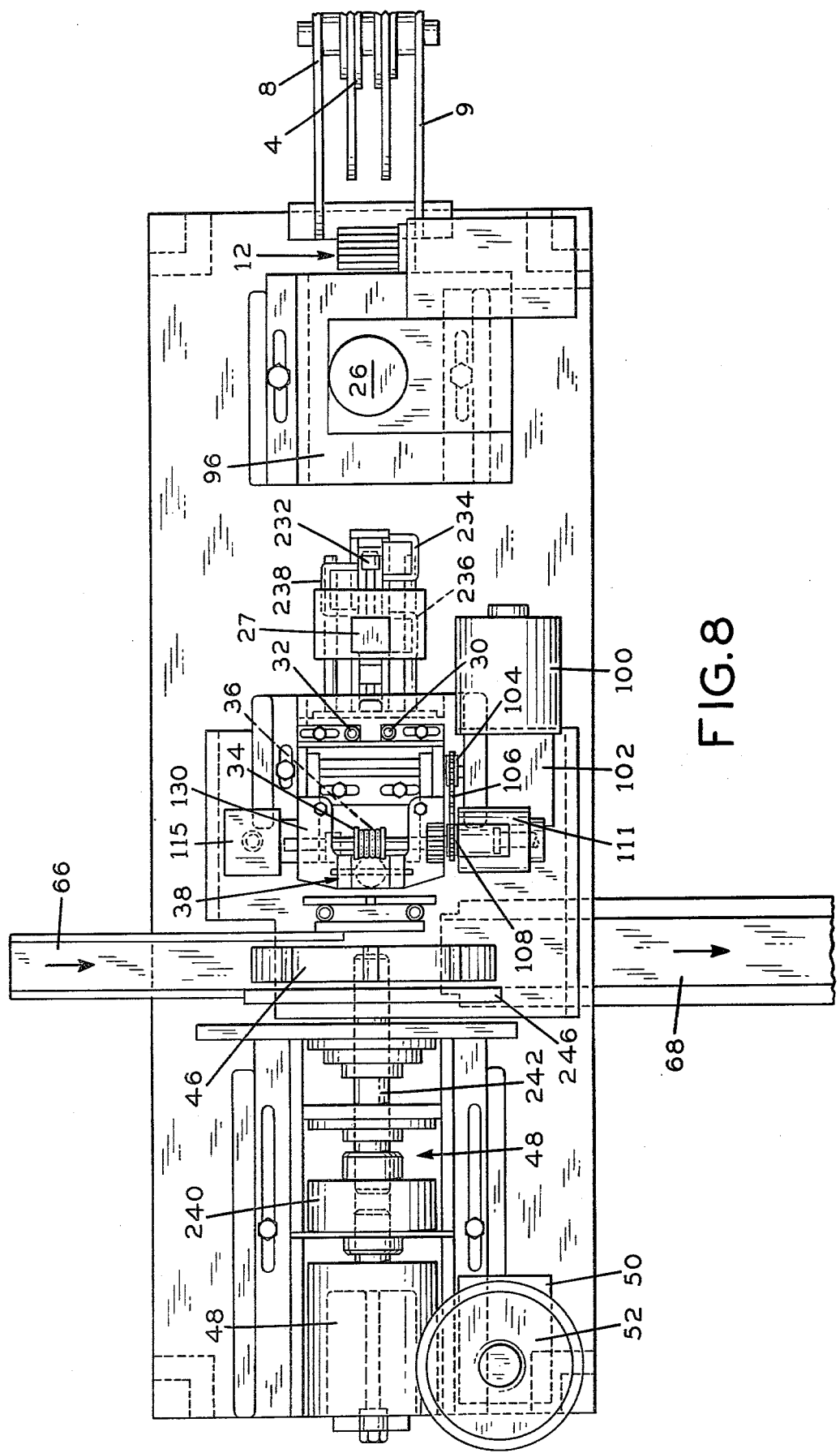
FIG. 8 is an enlarged plan view, similar to FIG. 1, but showing the apparatus in greater detail.
Figure 9:
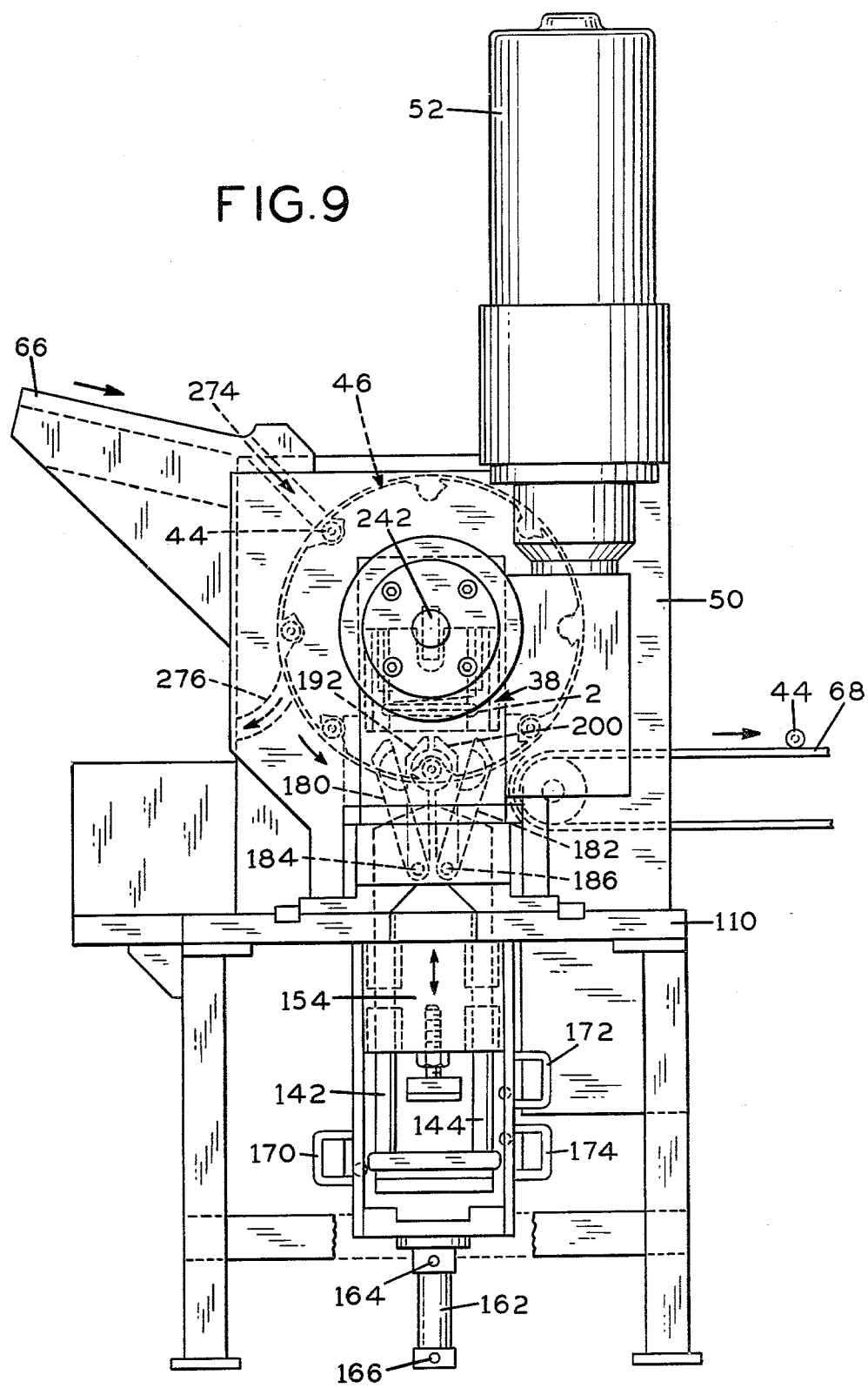
FIG. 9 is an end view taken from the left, of the apparatus of FIG. 8.
Figure 13:
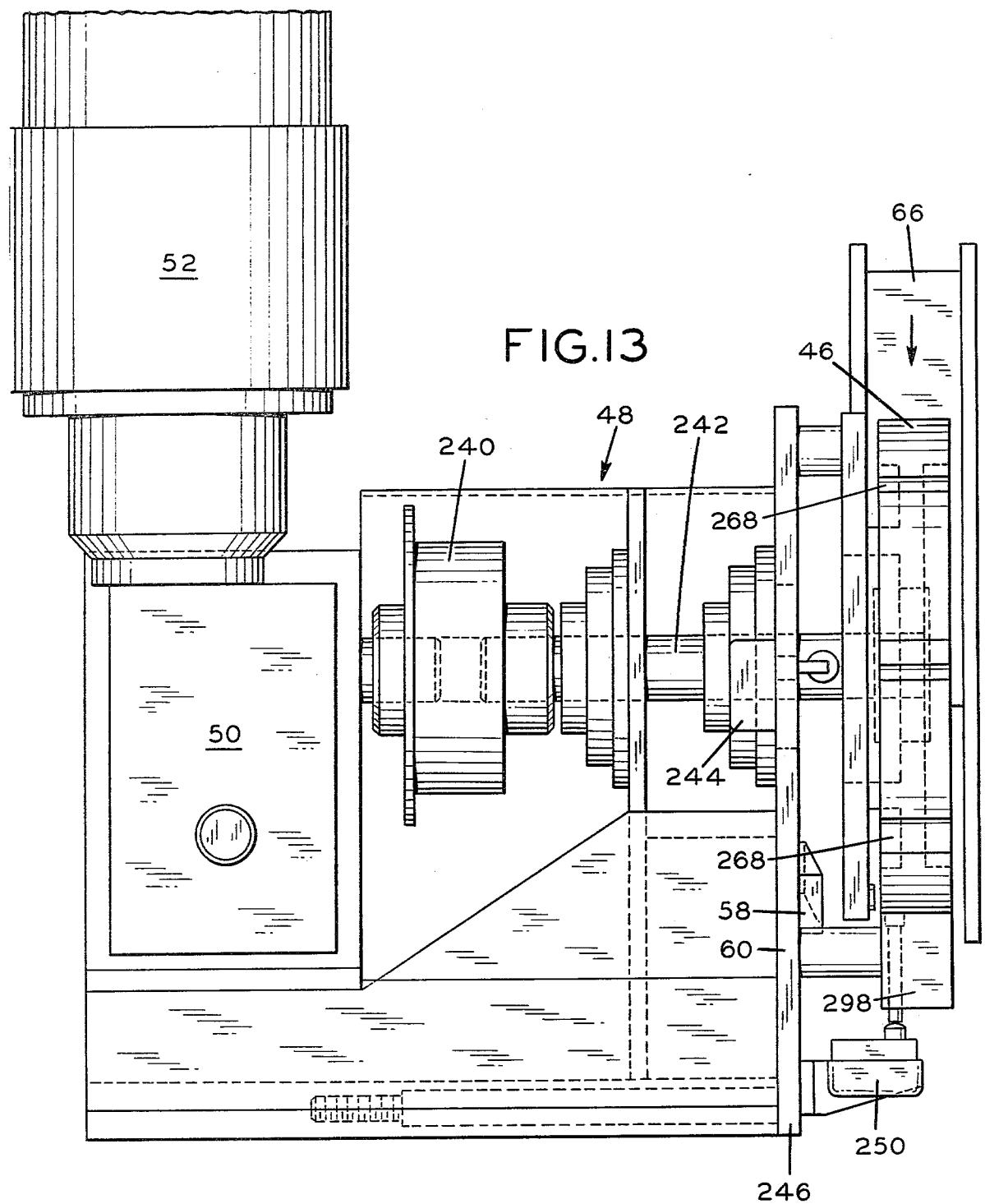
FIG. 13 is an enlarged side view of the carrousel and carrousel dome of the instant apparatus.
Figure 14:
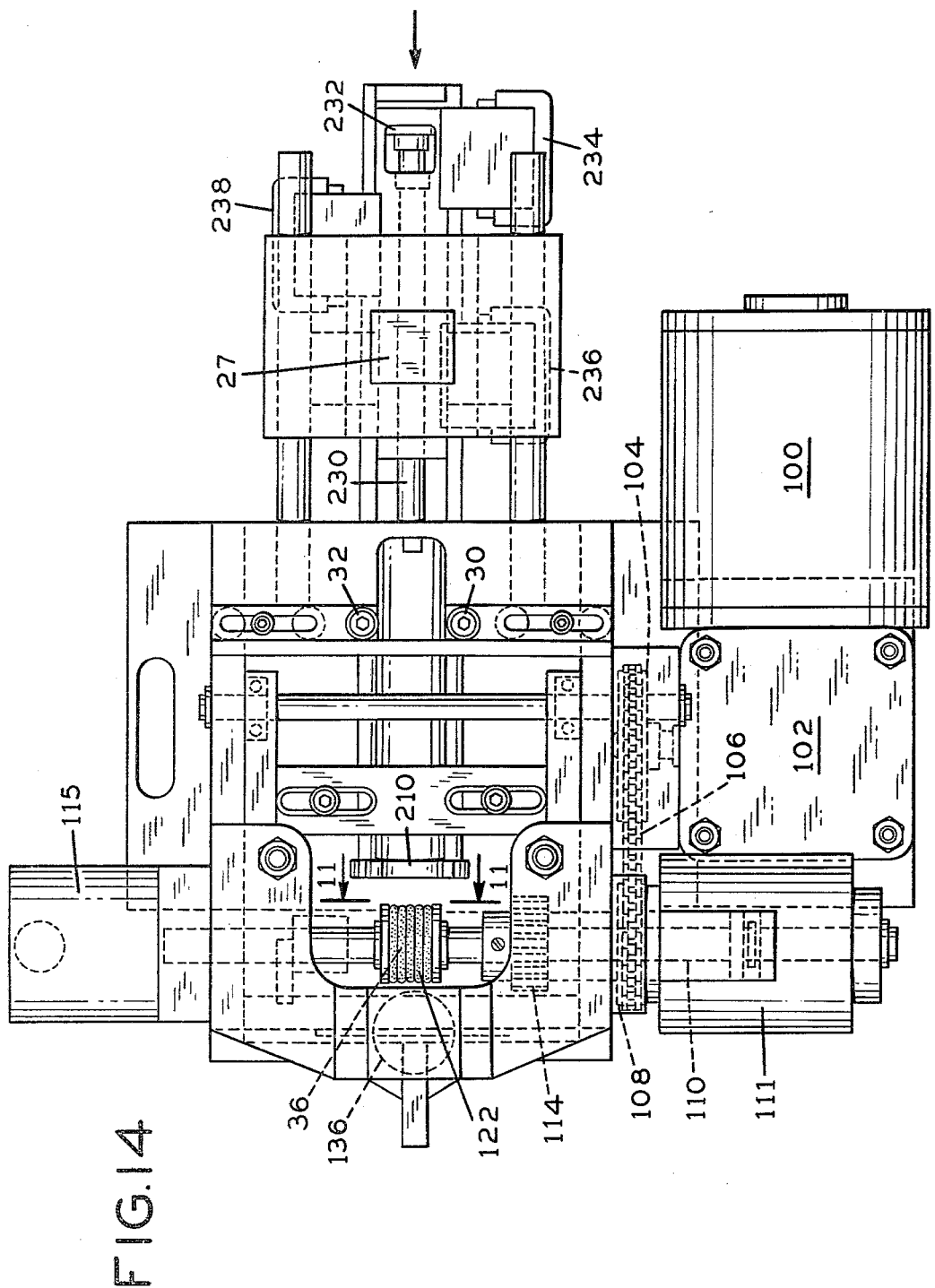
FIG. 14 is an enlarged top view of the sleeve feed mechanism.

Referring next to FIGS. 8, 9 and 10, base 96 of stamping station 26 supports posts 14, 16, 18, 20, 22, 24 of drag brake 12. Motor 100, FIGS. 8, 10, 14, 15, through gear box 102, drives sprocket 104 which, in turn, drives chain 106 and sprocket 108 keyed to clutch-brake 111 which, in turn, drives shaft 110, FIGS. 11, 14. Gear 112 is keyed to one end of shaft 110 and drives knurled drive wheel 36 and gear 114 keyed to shaft 116 which drives drive wheel 34. The other end of shaft 110 is keyed to encoder 115, FIGS. 8, 14. Drive wheel 34 has end flanges 118, 120 and intermediate the flanges, the drive surface of drive wheel 34 is made up of o-rings 122, FIG. 11.

Guillotine 38, FIGS. 8, 10, 12 includes blade 124 having a slightly angled edge 126 mounted on support 130 for vertical reciprocal movement in blade guide 132. Piston rod 134 of two-way air cylinder 136 is attached to blade 124 for vertical reciprocation thereof as will be described.

As best shown in FIGS. 16, 17, grippers, generally designated 40, are mounted on frame 10 in carrier 140 fixed to the frame and include spaced shaft 142, 144 mounted for reciprocation, respectively, in bushings 146, 148, 150, 152 mounted in fixed member 154 of carrier 140. At their opposite ends, shafts 142, 144 are fixed to cross-members 156, 158 forming a movable box therewith. Cross member 156 is connected to piston rod 160 of two-way air cylinder 162 connected by air lines 164, 166 to an air supply source, not shown. For purposes later described, microswitches 170, 172, 174 are mounted in fixed positions on frame 140 and are activated by bosses 176, 178 on movable cross member 156.

Gripper arms 180, 182 are pivoted, respectively, at 184, 186, to cross member 158 and are interconnected for pivotal movement about pivots 184, 186, toward and away from each other by two-way cylinder 188 and piston rod 190. Grippers head 192, having spline ways 194, 196 and sleeve guide 198 is mounted in gripper arm 180. Gripper head 200, having spline ways 204, 206 and sleeve guide 208 is mounted in gripper arm 182.

Referring, next, to FIGS. 2, 10 and 21, pusher, generally designated 210, is mounted on frame 10 and includes a fixed frame 212 to which two-way air cylinder 214, having air lines 216, 218 connected to an air supply, not shown, is fixedly mounted. Pusher head 220 having splines 222, 224, 226, 228, is mounted on an end of piston rod 230 of air cylinder 214 and microswitch actuator 232 is mounted at the opposite end of piston rod 230. For purposes later described, microswitches 234, 236, 238 are mounted on frame 212 for actuation by actuator 232, as will be later described.

As best shown in FIGS. 1, 2, 10 and 13, indexing drive, generally designated 48 and driven by roller gear indexing drive 50, motor 52 and clutch-brake 53, includes overload clutch 240 for driving shaft 242 and carrousel 46 keyed thereto when the clutch is engaged and for stopping and locking shaft 242 and carrousel 46 when the brake is engaged. Preferably brake-clutch 53 is of the electric-magnetic type, the clutch being engaged when the electromagnet is energized or excited and the brake being engaged when the electromagnet is de-energized or at rest. Drive 50, motor 52, is mounted for rotation in bearing 244 in cam plate 60 also fixed mounted on frame 10 for purposes more apparent later herein. Cam 58 is mounted on plate 60 at approximately the 6 o'clock position relative to carrousel 46 for purposes later described.

Microswitch 250, microswitch shaft 252 and microswitch actuator 254, FIGS. 13, 18, 20, 22 are mounted in fixed position on plate 60 just before the 6 o'clock position of carrousel 46.

Referring to FIGS. 18, 20, 22, carrousel 46 and button plate 56 are bolted together by bolts 264 and mounted on shaft 246 by bolts 266. In the illustrated embodiment carrousel 46 is provided with eight identical and equally spaced cell receptacles 268 spaced around and opening in the periphery of carrousel 46. Each receptacle has an inwardly sloping entry 270 and a curved rear side 272 for engaging and holding cell 44 introduced therein. Carrousel 46 rotates in the direction of the arrow, FIGS. 18, 22.

In-feed chute, 66, FIGS. 18, 22 has a cell passage 274 for accepting cells 44 fed into in-feed chute 66 and for delivering the cells, one after the other, to cell receptacles 268 as such receptacles are rotated past the discharge end of passage 274. In-feed chute 66 extends downwardly and arcuately along and closely adjacent to the periphery of carrousel 46 and, adjacent its lower end, is provided with cell discharge passage 276.

In the embodiment of FIG. 18, discharge passage cover plate 278 is pivoted at 280 to in-feed chute 66 and is pivoted about pivot 280 to open and close discharge passage 276 by two-way air cylinder 282 pivoted at one of its ends at 284 to in-feed chute 66 and connected at its other end by piston rod 286 to cover plate 278.

In the embodiment of FIG. 22, discharge passage cover plate 290 is pivoted below discharge passage 276, at 292, to open and close discharge passage 276 by two-way air cylinder 294 pivoted at one of its ends at 296 to lower housing 298 and by piston rod 302 and lower 304 to plate 290.

Figure 23:
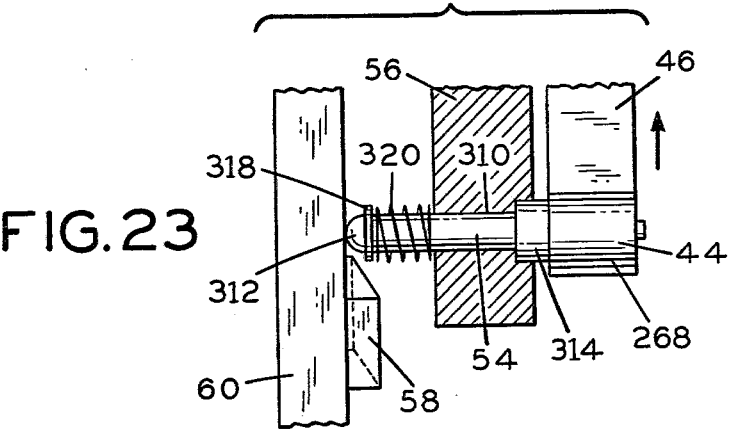
FIGS. 23, 24 and 24A are enlarged views, partly in section, taken at 23—23 and 24—24 FIG. 18 and showing various positions and operations of the carrousel.
Figure 24:
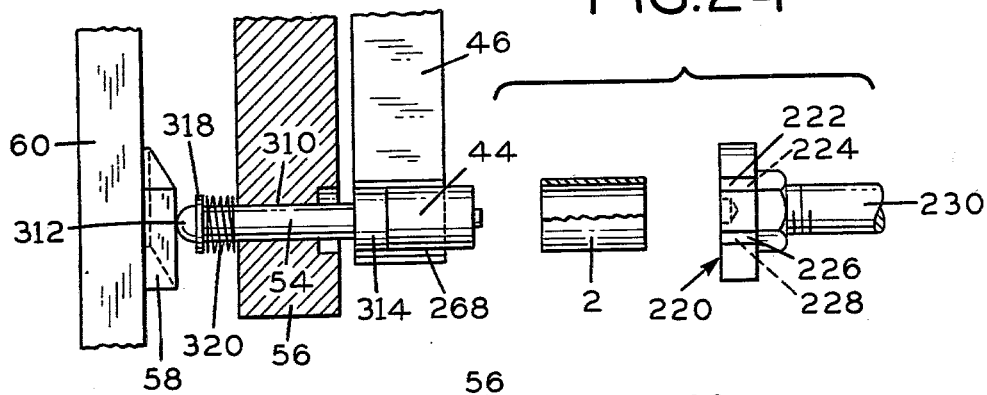
Figure 24A:
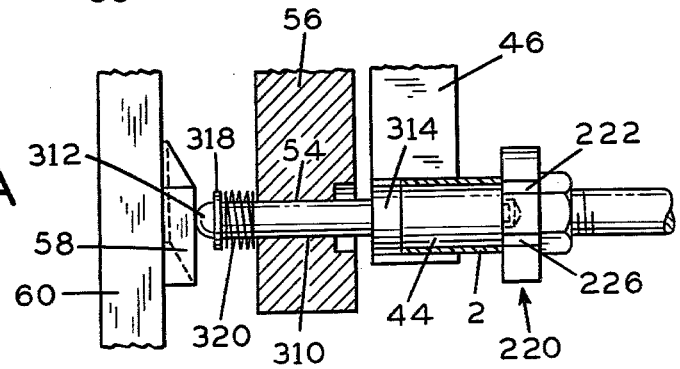

As best shown in FIGS. 20, 23, 24, 24A, 25, button plate 56, behind and in alignment with each of the cells receptacles 268 in carrousel 46 is provided with a button recess and passage 310. Each of the recesses and passages 310 contains a button 54 having an enlarged base 314, a head 312, a washer 318 and a coil compressor spring 320. Spring 320 urges base 312 into the recess in plate 56. Buttonhead 316 when it contacts cam 58, as will later be described, compresses spring 320 and advances base 314 out of the recess in plate 56 and pushes cell 44 in receptacle 268 of carrousel 46 outward, as shown in FIGS. 24, 24A.

Figure 25:
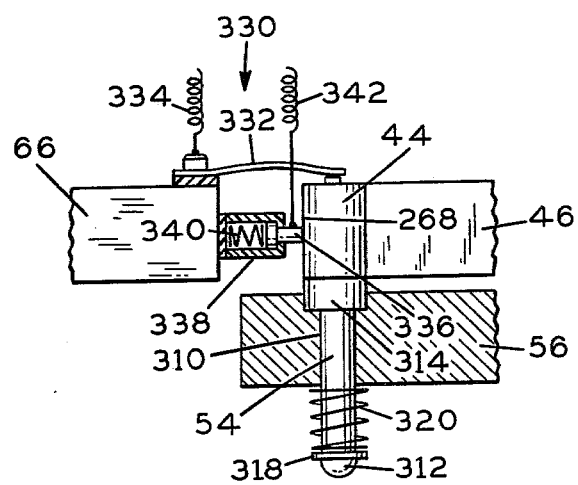
FIG. 25 is an enlarged view, partly in section, taken at 25—25, FIG. 22.

Referring to FIGS. 18, 22, 25, cell tester, generally designated 330, includes spring contact 332 fixed to in-feed chute 66 and connected to sensor, not shown, by lead 334 and contact 336 mounted in insulated housing 338 on chute 66 and urged by spring 340 toward cell 44 passing thereby. Contact 336 is connected by lead 342 to sensor, not shown.

In the operation of the apparatus of the instant invention, the cells 44 to be sleeved are aligned and stacked in tub 62, preferably with the cap or positive terminal end up, and the filled tubs are put on roller conveyor 64. Because of the angle or slope of conveyor 64, tubs 62 roll, by gravity, on rollers 80, 82, 86, 88 toward in-feed chute 66 end of conveyor 64 and are stopped by stop 94.

Tubular plastic 2 is supplied to the apparatus on spool 4 and the spool is mounted on the apparatus on shaft 6 placed on carriers 8, 9. With spool 4 on shaft 6 and carriers 8, 9, the end of tubular plastic 2 is threaded through posts 14, 16, 18, 20, 22, 24 of drag brake 12, through stamping station 26, and sensor 27, the end is opened up, ball 28 is inserted into the tube and the end of the tubular plastic is threaded between posts 30, 32 between drive wheels 34, 36 and to guillotine 38. With tub 62 of cells 44 in place on conveyor 64 and tubular plastic 2 threaded to guillotine 38, the apparatus is ready for sleeving.

The operator removes cells 44 from tub 62 on conveyor 64 and feeds the cells, one after the other, into passage 274 of in-feed chute 66. Carrousel 46 is indexed by motor 52, drive 50 and indexing drive 48 one station or, in the embodiments illustrated 45°. The lead cell 44 in passage 274 is stripped from the end of passage 274 by cell receptacle 268 in carrousel 46 and is advanced to cell tester 330. If the cell is in the proper orientation, i.e., so that the cap end or positive terminal of the cell contacts spring contact 332, and the casting contacts contact 336, and cell 44 is of the proper voltage, i.e., is a good cell, cover plate 278, 290, as the case may be, is closed, discharge passage 276 is closed and, on the next indexing step, carrousel 46 with cell 44 in receptacle 268 is advanced to the next station. If, on the other hand, cell 44 is not of the proper voltage, shorted, open or missing, cover plate 278, 290, as the case may be, remains open and the cell is discharged from receptacle 268 and carrousel 46 through passage 276.

With a good cell, properly oriented and remaining in receptacle 268 after carrousel 46 is advanced past discharge passage 276, during the next indexing step receptacle 268, with the good, properly oriented cell therein, is advanced past microswitch actuator 254 holding microswitch shaft 252 and microswitch 250 depressed. The cell to be sleeved is advanced to the sleeving station and the tubular plastic feed, guillotine, gripper and pusher mechanisms are all set for operations. If, on the other hand, a bad cell or improperly oriented cell had been in receptacle 268 and had been discharged, microswitch activator 254 would have been free to raise as the empty receptacle 268 passed the switch station, opening microswitch 250 and deactivating the tubular plastic feed, guillotine, gripper and pusher mechanisms.

With a good cell, properly oriented, in receptacle 268, as carrousel 46 advances receptacle 268 to the sleeving station at the 6 o'clock position on carrousel 46, head 312 on button 310, FIGS. 23, 24, contacts and rides up cam 248, compresses spring 320 and advances base 314 of button 54 out of the other side of button plate 56. Base 314 pushes the cap or positive contact end of cell 44 at the 6 o'clock sleeving position of carrousel 46 out of the front of carrousel 46 for reasons more apparent later herein.

A good cell in carrousel receptacle 268, as the receptacle is advanced past microswitch activator 254, holds microswitch shaft 252 and microswitch 250 depressed momentarily. The clutch of clutch-brake 111 is energized through microswitch 174 to drive drive wheels 34, 36 to advance tubular plastic 2 one sleeve length, guillotine 38 is activated to cut the one sleeve length from the lead end of tubular plastic 2, grippers 40 are raised to engage the one sleeve length of tubular plastic.

Where tubular plastic 2 is pre-printed, stamping station 26 is not operated and the length of feed is controlled by sensor 27. After the pre-printed section of tubular plastic 2 passes through sensor 27, the sensor deactivates the clutch and activates the brake of clutch-brake 111. Where unprinted tubular plastic 2 is used, the clutch of clutch-brake 111 is deactivated by the encoder 115 after a pre-set interval and the brake of clutch-brake 111 is activated to stop the tubular plastic feed. While the feed of unprinted tubular plastic 2 is stopped, the unprinted tubular plastic is stamped at stamping station 26.

Before each sleeve length is cut from the tubular plastic, gripper arms 180, 182 and gripper heads 192, 200 begin to be closed by air cylinder 188 holding the sleeve lengths end as it is cut and are then fully closed and lower the cut sleeve length into alignment between pusher head 220 and the cell 44 at the 6 o'clock position of carrousel 46. As gripper heads 192, 200 close the cut sleeve length is opened. Pusher 210 is then activated to push the cut sleeve length out of gripper heads 192, 200 and onto the cell. Gripper arms 180, 182 and gripper heads 192, 200 are then opened and carrousel 46, FIGS. 18, 22, is advanced to the next station where the sleeved cell is discharged, by gravity, from carrousel 46 onto discharge conveyor 68 on which the sleeved cell is advanced and, from heat tunnel 70 the sleeved cell is discharged onto discharge chute 72. The cycle is repeated for each cell.

In the apparatus of the instant invention, each operation is dependent upon the immediately preceding operation. Thus, if the cell initially fed to carrousel receptacle 268 is reversed or a bad cell and is discharged from the carrousel at discharge passage 276, microswitch 250 is not activated to energize motor 100 and advance tubular plastic 2. Likewise, guillotine 38, grippers 40 and pusher 210 are not activated. If on the other hand, a properly oriented, good cell is in carrousel receptacle 268 and is advanced past microswitch 250 to activate the microswitch and energize motor 100 to advance a cell length of tubular plastic 2, guillotine 38 is also activated. As gripper arms 180, 182 are advanced by air cylinder 162, microswitch 172 is activated to energize air cylinder 188 and close arms 180, 182 to engage gripper heads 192, 200 with the fed sleeve length end of tubular plastic 2 which, as it is gripped, is cut from the end of the tubular plastic supply by blade 124. As gripper arms 180, 182 continue their advance, boss 178 contacts and closes microswitch 172 and reverses air cylinder 162 to retract arms 180, 182. As arms 180, 182 are retracted, boss 176 contacts and clears microswitch 170 energizing air cylinder 214 to advance pusher head 220 to push the cut sleeve length out of gripper heads 192, 200, splines 222, 224, 226 and 228 on head 220 passing through spline ways 194, 196, 204, 206 in gripper heads 192, 200 to assure that the cut sleeve length in the gripper heads is pushed from the gripper onto cell 44 at the sleeving station. The cell at the sleeving station, as already noted, has been advanced by the button 54 and cam 58. Because of the light weight of the cells and the advanced position, the advancing sleeve is positioned around the cell without interference from the adjoining area of carrousel 46.

In the feed of tubular plastic 2, ball 28 is slightly smaller than the tube inner diameter. Thus, ball 28 opens the tube without stretching and without totally removing the creases along the opposite tube side walls. When the tube is again collapsed or flattened by drive wheels 34, 36, the width of the wheels are slightly narrower than the width of the flattened tube. Hence, the tube is not re-creased as it is flattened. The opposing creases are engaged by guides 198, 208 in gripper heads 192, 200 which tend to hold the cut section alignment in the heads and cause the sleeve to grip the cell casing and remain in position while the sleeve is heated and shrunk onto the cell.

The tubular sleeve can be of any dielectric material which can be flattened and rolled into a coil on a spool and opened up and which, upon heating, will shrink. Plastic material, particularly polyvinyl chloride (PVC) have been found especially useful for this purpose.

The terms and expressions used herein are used for the purpose of illustration and description of the preferred embodiments are not to be taken as limitations of the invention as defined by the appended claims. Modifications of the apparatus, within the spirit and scope of the invention, as defined by such claims, will be apparent to those skilled in the art to which the invention is directed.

What is claimed is:

1. An aparatus for applying and affixing a heat shrinkable dielectric sleeve to a galvanic cell said apparatus including cell feeding carrousel means, means for feeding tubular sleeve material from a supply spool and for cutting sleeve length sections from the fed end of said material, means for gripping and opening each sleeve length section as said section is cut, battery test means on said carrousel, means on said test means for rejecting from said carrousel cells found defective by said test means, means for aligning said gripped and opened sleeve section with a cell on said carrousel which has passed said test means and is to be sleeved, means for pushing said cut section from said gripping means onto said cell and heater means for heating and shrinking said cut section of said sleeve material on said cell.

2. An apparatus, as recited in claim 1, in which said carrousel includes roller gear indexing drive means.

3. An apparatus, as recited in claim 1, in which said battery test means includes means for rejecting cells which are reversed.

4. An apparatus, as recited in claim 3, in which said carrousel includes a plurality of stations, each station including means for receiving a cell to be sleeved and for detecting stations from which cells have been rejected and for interrupting said feeding, cutting, gripping, aligning and sleeve pushing means.

5. An apparatus, as recited in claim 1, in which said means for feeding tubular sleeve material includes a knurled wheel and a rubber surfaced wheel.

6. An apparatus, as recited in claim 5, in which said rubber surfaced wheel includes a plurality of o-rings.

7. An apparatus, as recited in claim 6, in which said gripping means includes opposed gripping arms, each having a gripping head and means for engaging and holding said gripping heads in contact with a cut sleeve section and for opening said cut sleeve section engaged therein.

8. An apparatus, as recited in claim 7, in which said pushing means includes a pushing head for pushing said cut sleeve section engaged and opened in said gripper heads from said gripper heads and onto a cell in said cell feeding means.

9. An apparatus, as recited in claim 8, in which said pushing head includes splines and said gripper heads include spline way for receiving and passing said head splines.

10. An apparatus, as recited in claim 1, in which said carrousel includes a plurality of stations each station including means for receiving a cell to be sleeved.

11. An apparatus, as recited in claim 10, in which said carrousel includes an indexing drive for advancing and stopping said carrousel at each of said stations.

12. An apparatus, as recited in claim 1, in which said means for feeding tubular sleeve material includes an encoder for stopping the feed of said tubular sleeve material after a pre-determined length of tube has been fed.

13. An apparatus, as recited in claim 11, in which said means for feeding tubular sleeve material includes an encoder for stopping the feed of said tubular sleeve material after a pre-determined length of tube has been fed.

14. An apparatus, as recited in claim 1, in which said means for feeding tubular sleeve material includes a photocell sensor for stopping the feed of said tubular sleeve material after a pre-determined length of tube has been fed.

15. An apparatus, as recited in claim 11 in which said means for feeding tubular sleeve material includes a photocell sensor for stopping the feed of said tubular sleeve material after a pre-determined length of tube has been fed.

16. An apparatus, as recited in claim 1, in which said apparatus includes conveyor means for feeding cells to said cell feeding means.

17. An apparatus, as recited in claim 11, in which said apparatus includes conveyor means for feeding cells to said cell feeding means.

* * * * *